United States Patent
Alvarez

(10) Patent No.: US 7,715,653 B2
(45) Date of Patent: May 11, 2010

(54) NON-PLATFORM SPECIFIC METHOD AND/OR SYSTEM FOR NAVIGATING THROUGH THE CONTENT OF LARGE IMAGES, ALLOWING ZOOM INTO OR OUT, PAN AND/OR ROTATION

(75) Inventor: Maria Berta Alvarez, Mexico City (MX)

(73) Assignee: Humberto Garduno, Doral, FL (US)

( * ) Notice: Subject to any disclaimer, the term of this patent is extended or adjusted under 35 U.S.C. 154(b) by 1073 days.

(21) Appl. No.: 11/396,053

(22) Filed: Apr. 3, 2006

(65) Prior Publication Data
US 2007/0230824 A1   Oct. 4, 2007

(51) Int. Cl.
*G06K 9/32* (2006.01)

(52) U.S. Cl. .................. 382/293; 382/305; 382/232; 382/233

(58) Field of Classification Search .......... 382/232, 382/274, 293, 305
See application file for complete search history.

(56) References Cited

U.S. PATENT DOCUMENTS

| | | | |
|---|---|---|---|
| 6,286,001 B1 * | 9/2001 | Walker et al. ............ 707/9 |
| 6,466,262 B1 * | 10/2002 | Miyatake et al. .......... 382/284 |
| 6,934,416 B2 * | 8/2005 | Yamaguchi et al. ........ 382/232 |
| 7,149,370 B2 * | 12/2006 | Willner et al. ............ 382/305 |
| 2003/0080963 A1 * | 5/2003 | Van Hook et al. .......... 345/501 |
| 2004/0175059 A1 * | 9/2004 | Willner et al. ............ 382/305 |
| 2005/0089241 A1 * | 4/2005 | Kawanishi et al. ........ 382/274 |
| 2006/0109242 A1 * | 5/2006 | Simpkins ................ 345/156 |
| 2006/0262184 A1 * | 11/2006 | Peleg et al. .............. 348/36 |

OTHER PUBLICATIONS

Cunxun Zang et al., "Human-Centered Image Navigation on Mobile Devices", National Laboratory of Pattern Recognition, Institute of Automation, Chinese Academy of Sciences, IEEE 2008, p. 321-324.*

* cited by examiner

Primary Examiner—Brian Q Le
Assistant Examiner—Mekonen Bekele

(57) ABSTRACT

The present invention provides a unique method and/or system that facilitate navigating through the content of large images viewable on a wide range of computing devices, independently of the dimensions of their display area, and the dimensions of the digital images. The present invention creates dynamic digital images, which are displayed on a synchronized sequence to simulate a 2D and/or 3D visual experience. Such navigation allows the end user to zoom into or out, pan, and/or rotate the content displayed by using input components, such as touch pads, joysticks, and the like. The embodiments can be either stand-alone or client/server, based on the physical location of the images.

44 Claims, 12 Drawing Sheets

| END USER DEVICE | STORAGE CAPACITY | CPU SPEED | CLIENT/SERVER | STAND-ALONE |
|---|---|---|---|---|
| HIGH CAPACITY | SUFFICIENT | SUFFICIENT | YES | YES |
| MEDIUM CAPACITY | SUFFICIENT TO LIMITED | SUFFICIENT | YES | SOME DEVICES |
| LIMITED CAPACITY | LIMITED TO VERY LIMITED | INSUFFICIENT | YES | NO |

FIG. 1

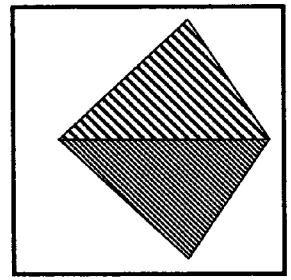 picture 7, 1
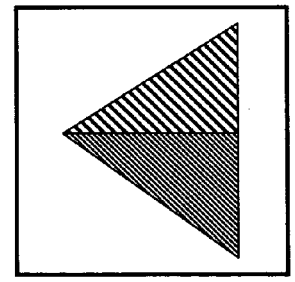 picture 7, 0
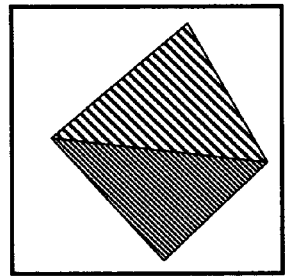 picture 2, 1
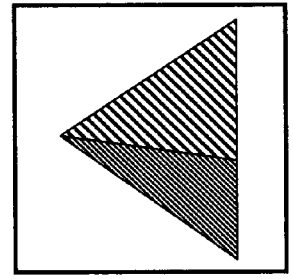 picture 2, 0
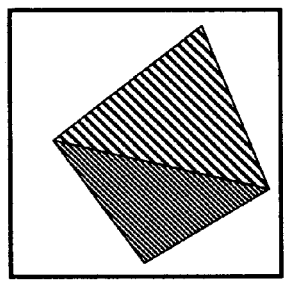 picture 1, 1
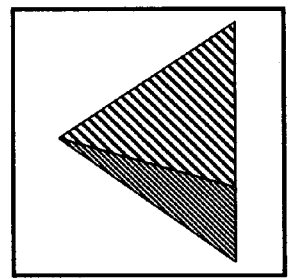 picture 1, 0
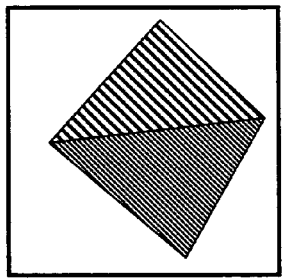 picture 0, 1
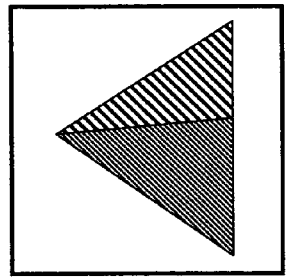 picture 0, 0
FIG. 4

| Local image cycle | (zoom level) stepCount | (Virtual image) incremento | (Real image) tamano |
|---|---|---|---|
| First | 0 to 9 | 354 | 236 |
| Second | 10 to 19 | 531 | 354 |
| Third | 20 to 29 | 796.5 | 531 |
| Forth | 30 to 39 | 1194.75 | 796.5 |

FIG. 10

| stepCount | Virtual image width | Real image width |
|---|---|---|
| 0 | 354 | 236 |
| 1 | 371.7 | 247.8 |
| 9 | 513.3 | 342.2 |
| 10 | 531 | 354 |
| 23 | 915.975 | 610.65 |
| 24 | 955.8 | 637.2 |

FIG. 11

| Navigation | xcuadro | ycuadro | source image |
|---|---|---|---|
| Starts | 0 | 0 | archivo_0_0_0.txt |
| RIGHT | 1 | 0 | archivo_1_0_0.txt |
| RIGHT | 2 | 0 | archivo_2_0_0.txt |
| UP | 2 | 1 | archivo_2_1_0.txt |
| UP | 2 | 2 | archivo_2_2_0.txt |
| UP | 2 | 3 | archivo_2_3_0.txt |
| UP | 2 | 4 | archivo_2_4_0.txt |
| UP | 2 | 4 | archivo_2_4_0.txt |

FIG. 12

NON-PLATFORM SPECIFIC METHOD AND/OR SYSTEM FOR NAVIGATING THROUGH THE CONTENT OF LARGE IMAGES, ALLOWING ZOOM INTO OR OUT, PAN AND/OR ROTATION

CROSS-REFERENCE TO RELATED APPLICATIONS

Not Applicable.

FEDERALLY SPONSORED RESEARCH OR DEVELOPMENT

Not Applicable.

NAMES OF THE PARTIES TO A JOINT RESEARCH

Not Applicable.

COMPUTER PROGRAM LISTING COMPACT DISK APPENDIX

The annexed computing program listing appendix is incorporated-by-reference to this application. Such appendix includes 2compact disks. Compact disk "COPY 1" contains the files: cellJ2ME.txt of 44,278 bytes created Mar. 28, 2006, and pcJavaApplet.txt of 46,267 bytes created Mar. 27, 2006. Compact disk "COPY 2" is an identical duplicate of compact disk "COPY 1", and so it contains the files: cellJ2ME.txt of 44,278 bytes created Mar. 28, 2006, and pcJavaApplet.txt of 46,267 bytes created Mar. 27, 2006.

TECHNICAL FIELD

The present invention relates generally to computer graphics processing and in particular, to the manipulation of image data in order to provide movement and magnification (zoom in/out) of an image.

BACKGROUND OF THE INVENTION

Interest in creating rich user experiences has resulted in the proliferation of software applications that allow the end user to zoom in/out, pan, and/or rotate through the content of digital images. Most of these software applications have been designed around the capabilities of a particular type of computing device (predominantly PCs), typically using the World Wide Web (a.k.a. Internet) to access digital images from a repository physically maintained in remote servers.

As a wide range of computing devices of varying characteristics are available to the end user in today's market, the original design of such software applications is being challenged, since they are not always well suited for smaller computing devices. The computing device characteristics relevant to this matter are: the size and orientation (portrait or landscape) of the display area made available to the software application (only known at execution), the storage capacity (either built-in or accessible thru an external medium), and the data processing speed.

It is important to note that the data transfer speed of the network is an important enabler of client/server software applications with such navigation capabilities, in particular if the computing device has significant limitations, like it is the case of most cellular phones. Fortunately, networks with broadband speeds (i.e. 3G) are now available in major markets worldwide, allowing wireless portable devices to access data from remote servers at a reasonable response time.

Thus, it would be an advance in the art to develop a generic non-platform specific method and/or system that can be easily adapted to the variety of storage and data processing characteristics of the wide range of computing devices available in the market, providing navigation capabilities regardless of the size and orientation (portrait or landscape) of the computing device display area and the size and orientation of the digital images.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a methodology and/or system that facilitate navigating through the content of large images, simulating a 2D and/or 3D visual experience by allowing the end user to zoom in/out, pan, and/or rotate their content. One of the significant advantages provided by the present invention is its generic non-platform-specific design, which allows its implementation in stand-alone and client/server environments, and the flexibility to easily adapt it to make use of the storage capacity and data processing speed present at the particular computing device.

According to an aspect of the invention, the images to be visualized aren't required to be transformed before they are made available to the end user. In its simplest form, a single digital picture of a standard format (i.e. jpeg, png, or tiff) can be visualized. It is recommended though, to transform the digital pictures by creating smaller scaled versions of the originals, and optionally, to transform the resulting scaled digital images into digital data files containing the byte representation of the colors of their pixels. By doing so, the navigation is more efficient since smaller sections of the digital images/files are accessed during execution. For 3D visual navigation (rotation), pictures of the subject must be taken at different angles and following an arrangement that allows a smooth visual transition between digital images, when they are displayed in succession (a.k.a. animation), following a circling like effect.

In another aspect of the invention, the methodology and/or system calculate the dimensions of an intermediate image, hereinafter called "Cut-Region image", with dimensions proportional to those of the display area. The sections of the images/files to be retrieved are based on the dimensions of this image. By making the Cut-Region image larger than the display area, computing devices with enough data processing speed can magnify it and/or use its boundaries to produce the zoom and pan effects locally, without requiring to retrieve new sections for each and every motion.

According to yet another aspect of the invention, the methodology and/or system calculate the dimensions of an intermediate virtual image, hereinafter called "Virtual image", with dimensions proportional to those of the digital images/files, and having at least one of its sides equal to the corresponding side on the Cut-Region image. It is this correlation that allows the synchronization between the display area dimensions and those of the digital images/files, allowing the display of as much content as possible, starting with the first image shown to the end user.

Furthermore, the zoom into or out effect is achieved by the synchronized magnification of the Virtual image and the magnification of the Cut-Region image (if this one is larger than the display area). The pan navigation follows a similar approach, the Virtual image dimensions represent the boundaries, and the local dimensions of the Cut-Region image determine if a new section of the digital image/file is required; while the visual current position of the end user is determined by the (x, y) position of the point at the center of the display area within the two-dimensional space of the Virtual image.

According to still another aspect of the invention, the methodology and/or system leaves to the specific embodiment the implementation of the user interface (UI), as long as such UI provides the method and/or system a unique identifier to determine the desired type of motion (pan, zoom, or rotation) and the desired direction (up, down, left, right, into, or out). This approach is in line with the generic non-platform specific design, by allowing the use of a wide range of input components, such as touch pads, joysticks, touch screens, mouse, plug-in applications (i.e. consoles), cellular phone soft-keys, and the like.

In reference to another aspect of the present invention, the embodiments of the methodology and/or system can be stand-alone or client/server, making it possible to place the functions of the method and/or system and the digital images/files where it is more appropriate for the specific embodiment. The preferred embodiment consists of a client/server environment where the server component is dedicated to maintain the digital images/files, dynamically create and transform (if needed) the sections requested, and dispatch the resulting digital images over the network to the client.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 1 illustrates the typical characteristics (relevant to the present invention) found on today's computing devices, and how such characteristics determine whether a stand-alone and/or client/server implementation of the method and/or system is applicable, in accordance with an aspect of the present invention.

FIG. 4 illustrates samples of the different images/views resulting from the camera arrangement of FIG. 3 in accordance with an aspect of the present invention.

FIG. 10 shows the widths of the Virtual image in comparison to the widths of the Real image for some exemplary Local image cycles, in accordance with an aspect of the present invention.

FIG. 11 shows the widths of the Virtual image in comparison to the widths of the Real image for some exemplary stepCount values, in accordance with an aspect of the present invention.

FIG. 12 shows the values of xcuadro and ycuadro, as well as the source images in turn for an exemplary navigation, in accordance with an aspect of the present invention.

DETAIL DESCRIPTION OF THE INVENTION

Figure 2:
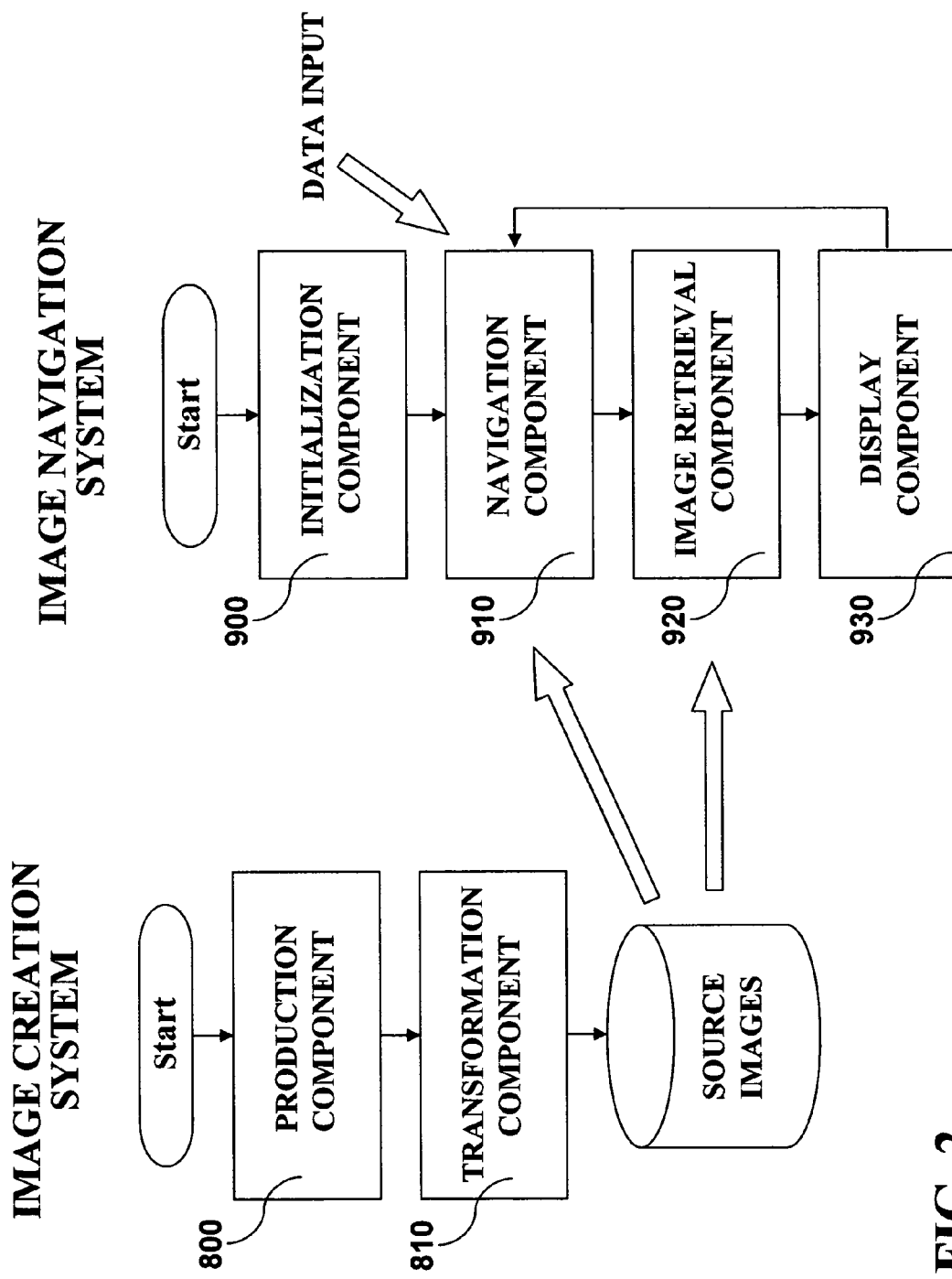
FIG. 2 is a block diagram of an image creation and image navigation systems, in accordance with aspects of the present invention.

The present invention is now described referencing the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details or with variations of them.

As used in this application, the terms "component" and "system" are intended to refer to a computer-related entity, either hardware, a combination of hardware and software, software, or software in execution. For example, a component may be, but is not limited to being, an object, a processor, a process running on a processor, a thread of execution, an executable, a computer, and/or a program. By way of illustration, both an application running on a server and the server can be a component. One or more components may reside within a process and/or thread of execution and a component may be localized on one computer and/or distributed between two or more computers.

The figures below relate to the zoom in/out, pan, and rotation of a sequence of digital images of an object of interest (OI), simulating an embodiment that navigates thru the content of photographs taken of a real subject. However, it should be appreciated that other applications and/or objects can be viewed and/or employed and such are contemplated to fall within the scope of the invention. The applications can include, but are not limited to: 3D navigation (zoom in/out, pan, and rotation motion) on a sequence of digital pictures taken from a panoramic scene, 2D navigation (zoom in/out and pan motion) on a sequence of digital images in such arrangement as to compose a large mosaic (i.e. a map), 2D and 3D navigation of digital pictures taken of art subjects, etc.

The present invention will now be described, making reference to FIGS. 1-12. Referring now to FIG. 1, the design of the present invention has been based in part on this chart, which defines three groups of end user computing devices according to characteristics relevant to the present invention and the availability of external resources.

The storage capacity column, in FIG. 1, refers to the capacity needed to store the digital images, either on the device built-in medium or thru an external medium source (i.e. CDs, flash cards, etc.). The CPU speed was qualified in terms of the minimum data processing speed required to manipulate the image data locally, providing an adequate response time to the end user. Client/Server embodiments of the present invention will require network speeds appropriate to the end user device characteristics, so that an adequate response time is achieved.

The goal has been to allow the present invention to work on a wide diversity of end user computing devices, without implying that the invention will work on each and every device available in the market. The type of device, its capacity (internal or external), and/or other aspects may not allow the present invention to work properly, or in accordance to certain standards or requirements.

Image creation and image navigation systems.—FIG. 2 is a general block diagram illustrating an image creation system and an image navigation system. The purpose of the production component 800 and the transformation component 810 is to create the digital images or data files, hereinafter called "source images", which are later used by the image retrieval component 920 of the image navigation system.

Regarding the image navigation system shown in FIG. 2, and after execution of the initialization component 900, the navigation component 910 receives input (e.g., from a user) by way of a user interface, a device control, or an external input component. Exemplary input components include a keypad, a d-pad, a touchpad, a joystick, and/or a pointing device such as a stylus, pen, or mouse, as well as any other type of communication link, channel, or network connection. The navigation component 910 translates the desired motion into a new (x, y) position of the point at the center of the display area within the Virtual image, and if applicable, communicates to the image retrieval component 920 the new section needed from the source images. Then the dynamically retrieved image (or local image kept by the navigation component 910 from a previous cycle) is passed over to the display component 930, which in turn reduces the image size (if needed) before displaying it on the screen of the end user computing device. The described flow repeats itself for every new input received by the navigation component 910.

Figure 3:
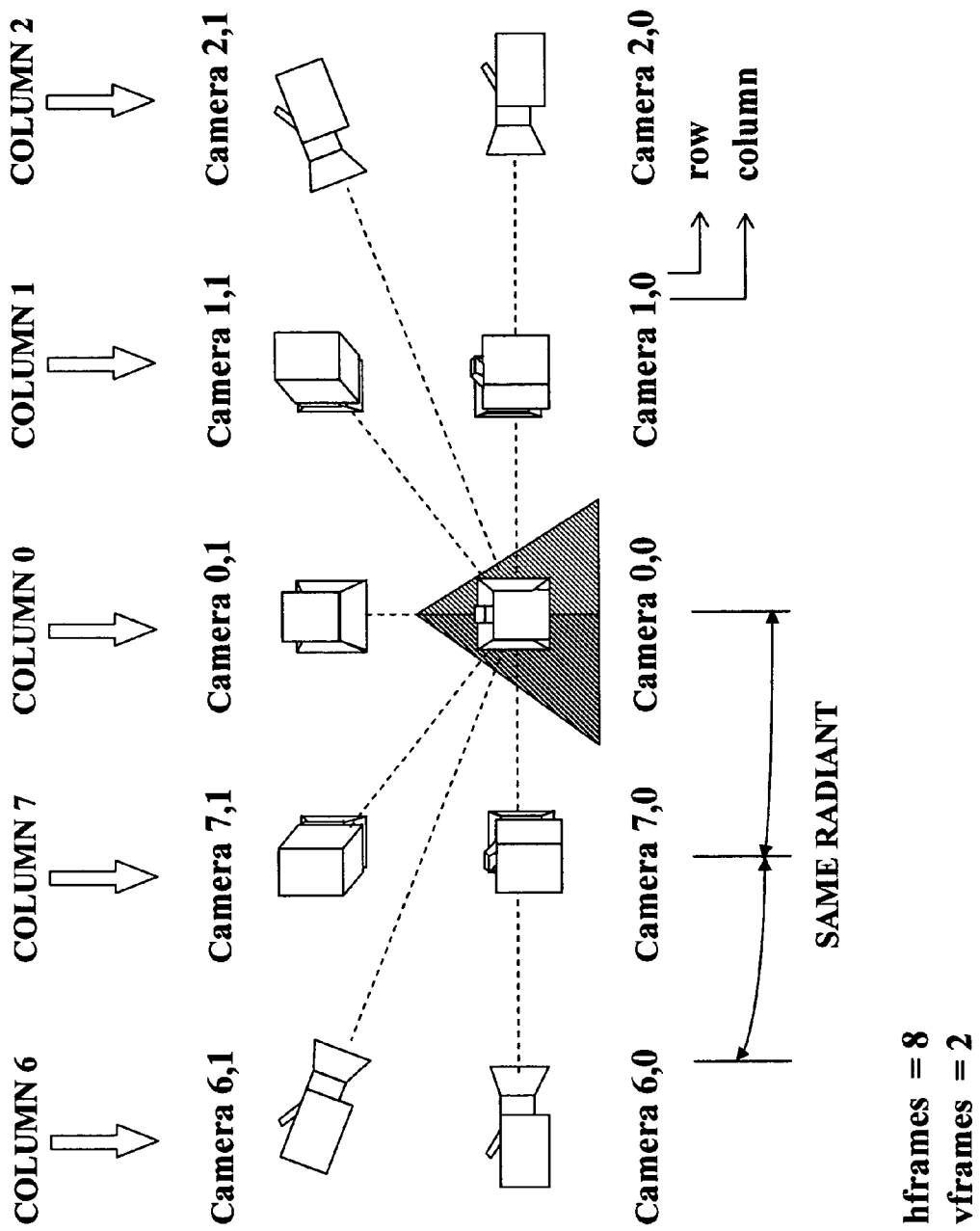
FIG. 3 illustrates an exemplary arrangement of cameras at two different heights, around an object of interest in accordance with an aspect of the present invention.

Production Component.—The method and/or system can navigate through the content of a single digital image (limited to zoom in/out and pan navigation), or through the content of a sequence of digital images. FIG. 3 illustrates an exemplary arrangement of 16 cameras around an object of interest (OI). All cameras are focused toward the center of the OI, and they are arranged in two different heights. Such camera arrangement follows a column-row like matrix, which can be used to uniquely identify each camera and the respective photographs taken. In order to provide a smooth 3D visualization of the images during navigation, it is recommended to maintain the same radiant distance between the 8 cameras at each row, and the same distance to the OI for all 16 cameras. FIG. 4 illustrates the resulting photographs/images obtained.

As shown in FIGS. 3 and 4, a naming convention is used. This convention includes at least a descriptive name, hereinafter called "archivo" (the same for all images related to an OI). If more than one image is involved, then integer numbers representing the column and/or row (relative position of the specific digital image) will be required to uniquely identify each image. The column position starts with cero and it has successive values up to the total number of images (hereinafter called "hframes") minus one, following the counter-clockwise order in which the respective photographs were taken on the horizontal axis (per row). Similarly, the row number starts with cero for the lowest bottom position, increasing its value up to the total number of images on the vertical axis (hereinafter called "vframes") minus one; the later representing the top most position. And, the file extension corresponding to the image format (i.e. jpeg, png, tiff, etc.).

Figure 5A:
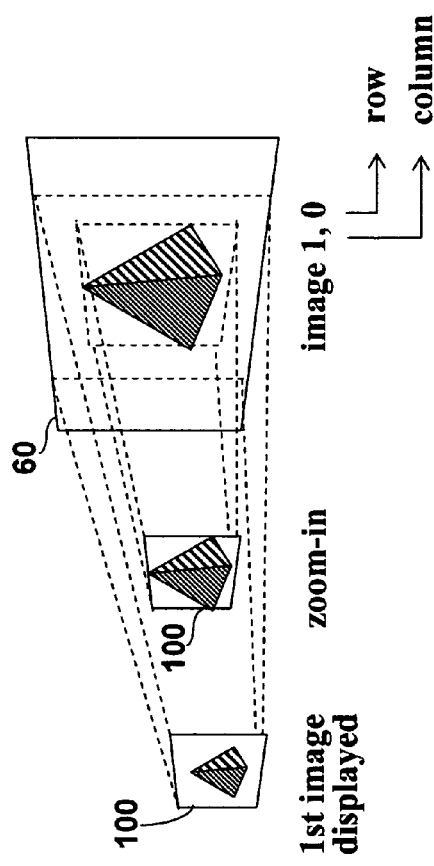
FIG. 5A illustrates the larger image sections retrieved when extracting the content directly from the original digital picture/image in accordance with an aspect of the present invention.

Transformation Component.—The images produced can be transformed in order to make the method and/or system more efficient. This is an optional component that takes place before the images are made available to the end user. The specific embodiment must ensure that the method and/or system can adequately interpret the format of the digital images, allowing the retrieval of any rectangular (or square) section from them. By not making the transformation mandatory, some embodiments of the method and/or system can greatly benefit; that would be the case of a centralized repository of digital pictures directly maintained by the end users (making it inappropriate for a third party to manipulate them). As the FIG. 5A illustrates, there is a disadvantage to this approach though, since larger sections of the original digital picture 60 will need to be manipulated by the image navigation system, in comparison to the usually much smaller size of the display area 100.

Figure 5B:
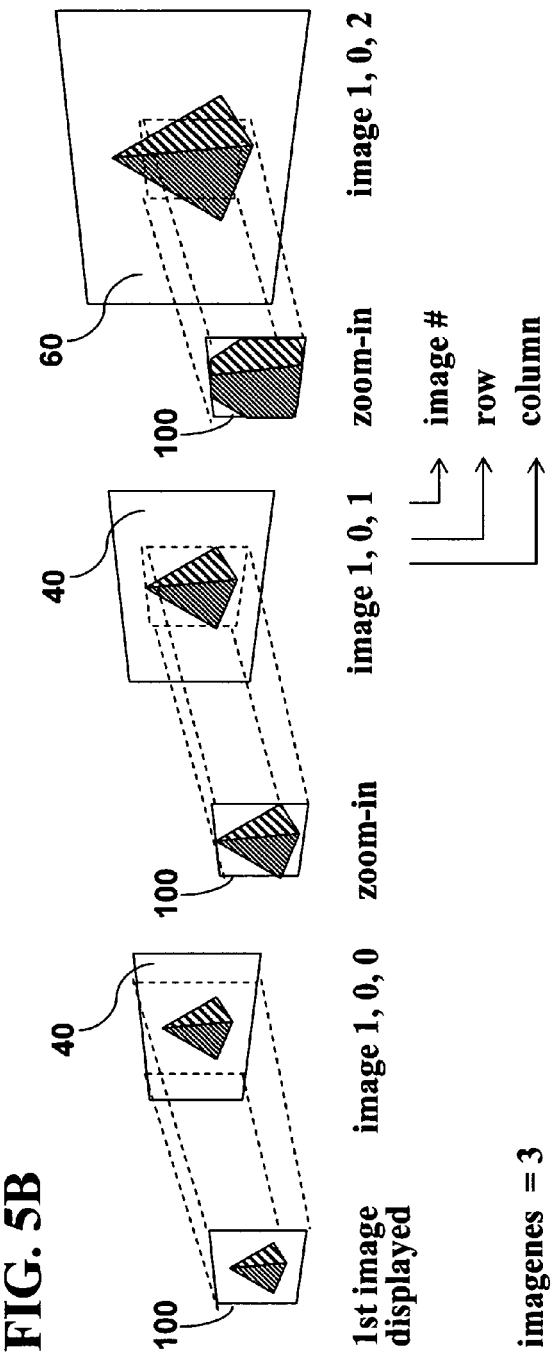
FIG. 5B illustrates the smaller image sections retrieved when extracting the content from scaled digital images of the original digital picture/image in accordance with an aspect of the present invention.

For most embodiments of the present invention, the transformation of the digital pictures will result in a better performance. FIG. 5B illustrates the use of scaled pictures 40 (smaller than the original picture) in addition to the original picture 60. This transformation requires all the scaled pictures 40 to maintain proportional dimensions to those of the original picture 60, and to keep the orientation of the later (either portrait or landscape). No other specific recommendation is made by this application regarding the number of scaled pictures 40 nor their size. The image navigation system benefits from the retrieval of smaller sections, closer to the dimensions of the display area 100, as it can be appreciated in FIG. 5B. This transformation introduces another integer number to the naming convention. Such number starts with cero for the smallest scaled picture 40, and increases its value up to the total number of pictures (hereinafter called "imagenes") minus one; including the largest picture, that is, the original picture 60.

Some embodiments may find an improvement in their performance by manipulating the content of data files rather than formatted digital pictures. An exemplary format of such data files would be to store eight bytes to represent the width and height of the digital picture (four bytes each), and then store three bytes per pixel in sequence, corresponding to the red, green, and blue values. In this example, no transparency would be manipulated by the method and/or system, but there is a 25% reduction in the size of the resulting data file by not storing the alpha value of each pixel. This optional transformation can be applied in conjunction with the transformation explained in the previous paragraph (illustrated in FIG. 5B), in which case, all scaled pictures 40 and the original picture 60 must be transformed to data files. As it can be inferred, the file extension must be changed to that corresponding to the type of data file (i.e. txt).

Initialization Component.—As part of the initialization process, the method and/or system searches (using "archivo") the storage repository either locally or via a remote server, in order to determine from the source images the values of: vframes, hframes, imagenes, the height of the smallest digital image (hereinafter called "alturaimg"), and the widths of the scaled images and original image (hereinafter called "img").

As it can be noted, names are being assigned to different elements throughout this application; such names correspond to the variables used in the annexed computer program listing appendix. This is the case of the following: "base" is the width of the display area, "alturabase" is the proportion between the height and width of the display area (its value is height of display area / base), and "maxSize" is the width of the largest source image (usually the width of the original picture). In order to maintain this document as concise as possible, and to facilitate its understanding, the value assigned or calculated for an element will be the same value used to determine the values of other elements hereinafter (as if it was a complete exercise from start to finish).

Figure 6:
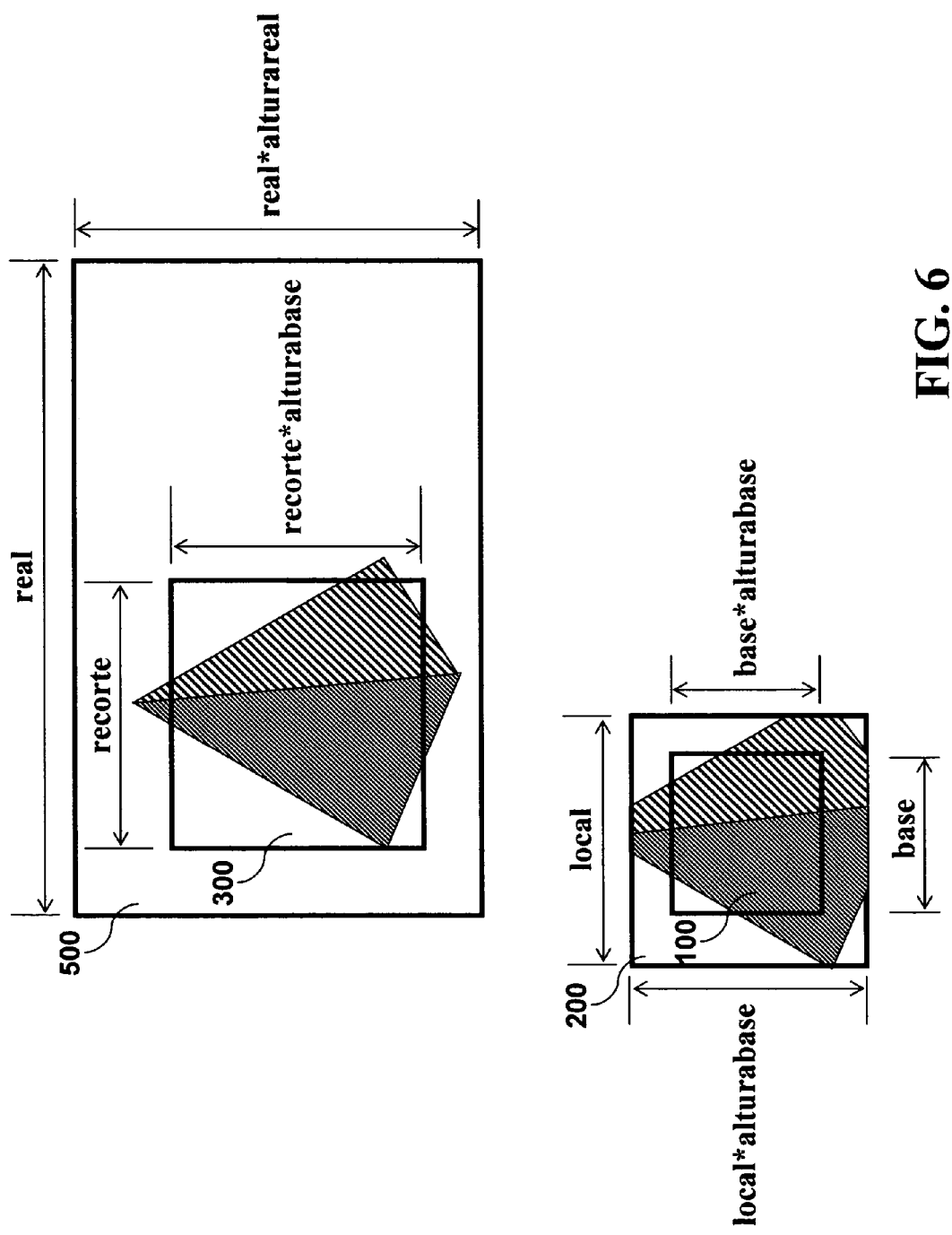
FIG. 6 is a graphical representation of some of the images and virtual images used by the method and/or system, illustrating their relationship, and the naming conventions and formulas used to determine their respective dimensions, in accordance with an aspect of the present invention.

FIG. 6 illustrates four basic elements, which are part of the generic non-platform specific design. Three of these elements have been previously mentioned: the display area 100, the Cut-Region image 300, and the Virtual image 500. The forth element is the local image 200, hereinafter called "Local image". Each of these is a rectangle (or square). The display area 100 is contained in the Local image 200 and the Cut-Region image 300 is contained in the Virtual image 500. The Local image 200 is a smaller version of the Cut-Region image 300.

The display area can move freely inside the two-dimensional space of the Local image, as the Cut-Region image can do so inside the two dimensional space of the Virtual image, but without going outside their respective boundaries. In order to allow the display area to move freely within the boundaries of the Virtual image, the Cut-Region image is moved (repositioned) every time the display area needs to move outside the boundaries of the Local image, so that the repositioned images are kept within valid boundaries.

The Cut-Region image represents the content section of the source images that is retrieved by the image navigation system; section that is passed over to the Local image, and in turn displayed. Once initialized, the dimensions of the Cut-Region image don't change. The zoom effect is achieved by changing the size of the Virtual image and/or the size of the Local image.

Figure 7:
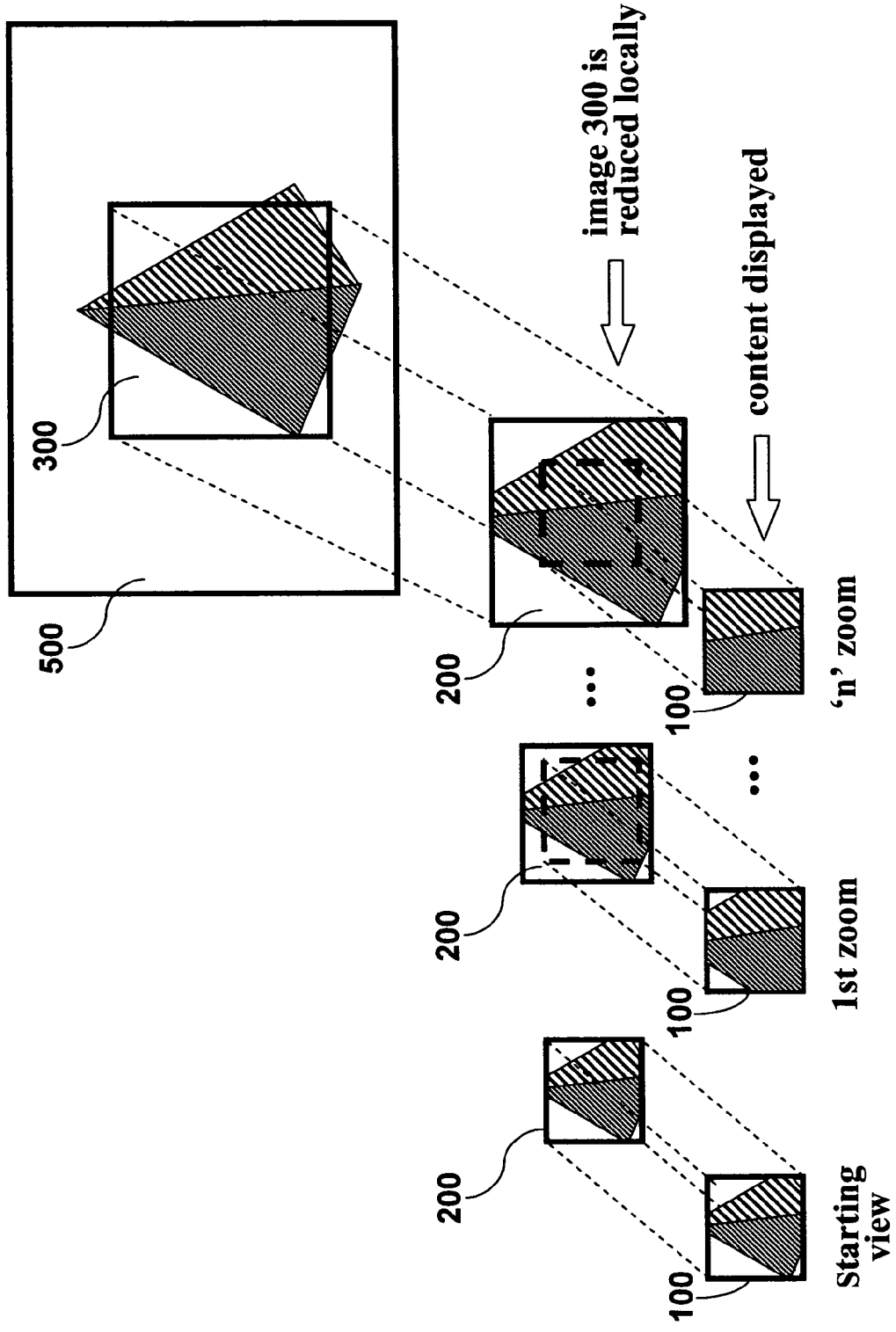
FIG. 7 illustrates an exemplary zoom effect, achieved by magnifying the Cut-Region image at predetermined sizes locally, in accordance with an aspect of the present invention.

FIG. 7 illustrates the behavior of the method and/or system for devices with enough data processing speed. The Cut-Region image 300 is initialized with a larger width than that of the display area 100, so that the Local image 200 can receive a smaller version of the Cut-Region image 300 locally (at various predetermined sizes), producing the zoom and pan effect without having to retrieve a new section from the source images with each and every motion. The image navigation system magnifies the Local image 200 locally, until it requires to retrieve a new Cut-Region image 300; because the later no longer corresponds to the content required or because otherwise the quality of the image would be compromised. Actually, the next Cut-Region image 300 can be retrieved in advance while the Local image 200 is being magnified locally. The performance is greatly improved by significantly reducing data transfer and/or data manipulation.

For devices with heavy limitations, like most cellular phones, the dimensions of the Cut-Region image are made equal to those of the display area (and these don't change after initialization). By doing so, the image navigation system retrieves a new Cut-Region image with each zoom or pan motion, in most cases. The zoom is achieved by the magnification of the Virtual image only. More data will be transferred and/or manipulated in comparison, but the quality of the image and the response time are not compromised.

As illustrated in FIG. 7, the size of Local image 200 is increased following a cycle that starts at the size of the display area 100 and ends at the moment its width is equal to the width of the Cut-Region image 300, just to be initialized again to its original dimensions in order to continue with the next cycle. The reduction of the Local image size produces the opposite effect (zoom out) locally, resulting in cycles with same values but following their reverse order.

Some of the attributes of the Local image are: "local" corresponds to its width (initial value=base), "mod" is the number of times the Local image is magnified per cycle, "localincr" is the number of pixels by which the Local image is magnified and it has an initial value: positive integer number other than cero or a calculated value=(width of Cut-Region image−base)/mod, "xobj" and "yobj" are the x-axis and y-axis position of the point at the center of the display area within the two-dimensional space of the Local image (initial values: xobj=local/2, and yobj=xobj*alturabase), and finally, "xl" and "yl" refer to the x-axis and y-axis position of the top left corner of the Local image, relative to the top left corner of the display area. xl and yl are used to determine the position of the Local image for display purposes and to validate if the display area is within boundaries (a value of cero means that the top left corners of both images are at the same position, and a negative value imply that the display area is within boundaries).

For example, if mod=10, base=180, height of display area=177, and width of Cut-Region image=270, then local starts with a value of 180, and it would have the following values for 11 consecutive zoom-in magnifications of the Local image: 189, 198, 207, 216, 225, 234, 243, 252, 261, 180, and 189. As previously explained, a new Cut-Region image is retrieved at the tenth zoom-in (every new cycle), being the image reduced to 180×177 for that specific magnification. And the values of some of the other attributes would be: localincr=(270−180)/10=9, alturabase=177/180=0.983333, and the height of Local image can be obtained by multiplying local times alturabase (i.e. it is equal to 234*0.983333=230.09, for the 6th zoom-in magnification).

Figure 8:
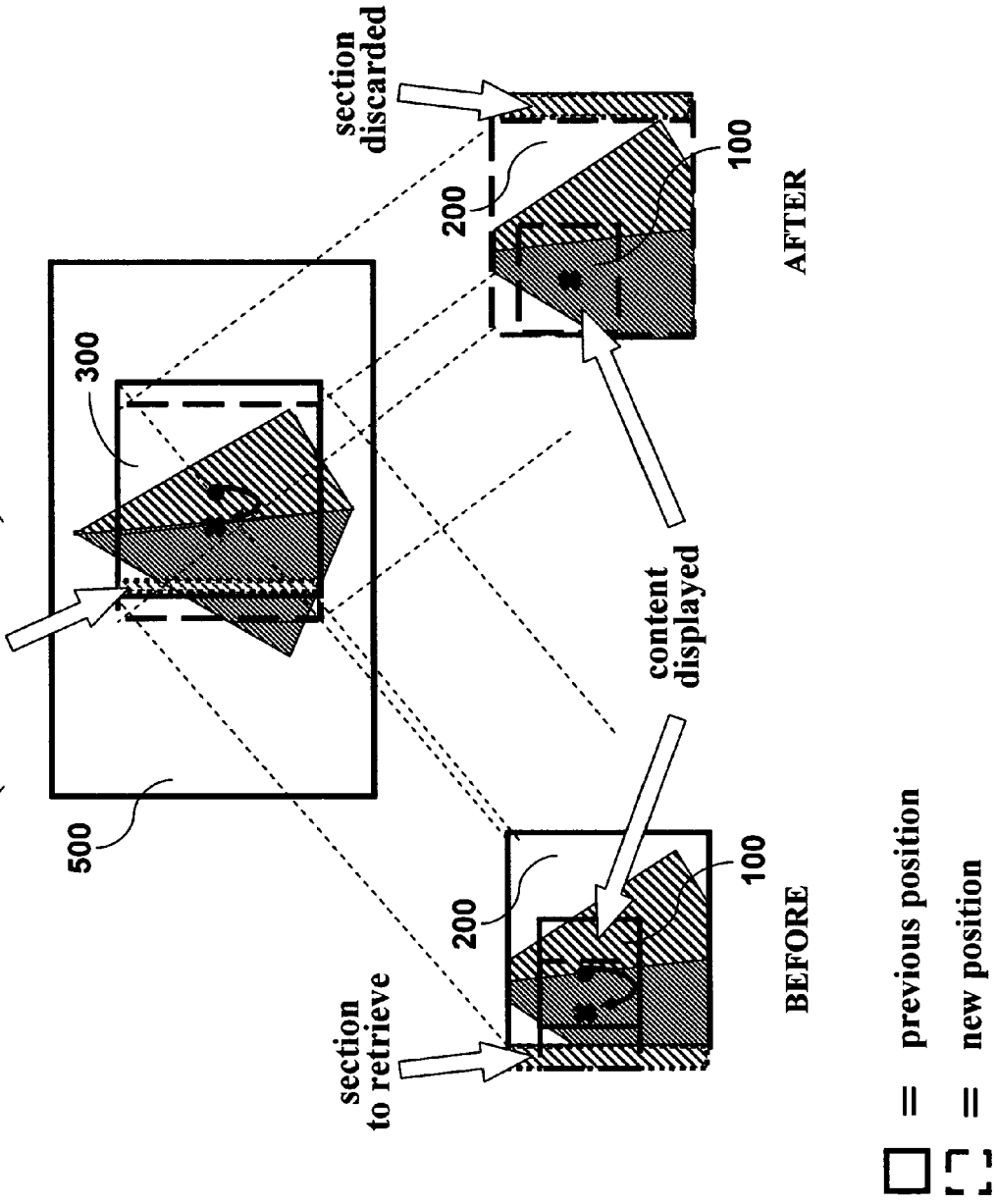
FIG. 8 illustrates an exemplary zoom effect, obtained by synchronizing the magnification of the Virtual image and Cut-Region images in accordance with an aspect of the present invention.

The method and/or system use a similar approach when dealing with the pan navigation. FIG. 8 illustrates an example of such behavior, applicable if the Cut-Region image 300 is greater than the display area 100. As result of an exemplary left pan motion, the repositioned display area 100 has a portion of its area outside the Local image 200; in which case, only the equivalent outside portion is retrieved from the source images. The Cut-Region image 300 is repositioned in the two-dimensional space of the Virtual image 500 as it is the display area 100 within the Local image 200; then the content of the Local image 200 is recomposed, by including the new portion of the image and discarding that same area from its opposite side, before it is displayed.

On the other hand, very limited devices do not have the data processing speed needed to allow the method and/or system to magnify the images with enough quality and/or acceptable response time locally. The method and/or system can implement this scenario by changing the initialization of three of its elements, as follows: width of the Cut-Region image=base, mod=1, and localincr is made equal to a positive integer number greater than cero (predetermined by the specific embodiment). Since Cut-Region image and Local image are made equal, the method and/or system may further replace all instances and references of Cut-Region image with Local image and Local image's.

One of the programs, in the annexed computer program listing appendix, corresponds to a PC based Java-Applet stand-alone embodiment, which uses the arrow keys for navigation and the space bar for transitioning between motion types. The other computer program, in the annexed computer program listing appendix, was developed in J2ME for a cellular phone embodiment, which uses the soft-keys.

The Cut-Region image represents the current section of the source images being manipulated, and its dimensions are proportional to those of the display area (once initialized these aren't changed). The dimensions of Cut-Region image and the dimensions of the Virtual image are used to correlate the display area with the source images. Some of the attributes of the Cut-Region image are: "recorte" corresponds to its width, and "factorecorte", which is a convenience variable used to determine recorte, relative to the display area (a decimal number representing a percentage from base). For example, if factorecorte=1.5, then the dimensions of the Cut-Region image would be: recorte=1.5*180=270, and its height=recorte*alturabase=270* 0.983333=265.5.

Figure 9:
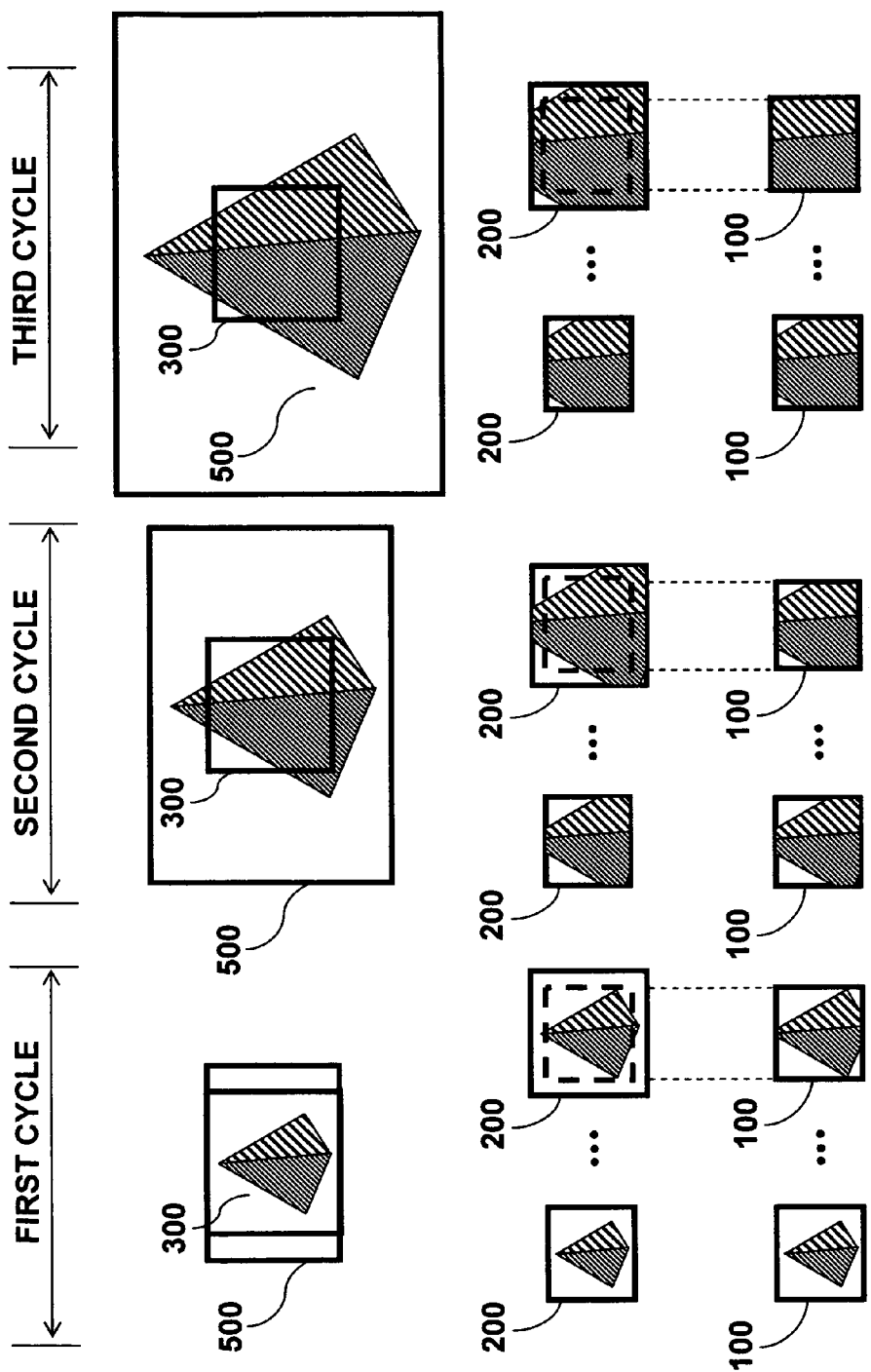
FIG. 9 illustrates an exemplary pan motion, and how the visual effect is achieved by determining the small portion of the Virtual image that would be retrieved from the digital picture, digital image, or data file; then reducing and merging that image section in order to be displayed in accordance with an aspect of the present invention.

The Virtual image is not a real image, but rather it represents the dimensions of an image, which is always proportional to the source images. As illustrated in FIG. 9, the Virtual image 500 is progressively magnified to produce the zoom in/out effect each time a motion results within the scope of a different Local image cycle.

Some of the attributes of the Virtual image are: "real" corresponds to the width of the Virtual image for a given Local image cycle, "alturareal" is the proportion between its height and width, "xobjreal" and "yobjreal are the x-axis and y-axis values of the point at the center of the Cut-Region image within the Virtual image (initial values: xobjreal=real/2, and yobjreal=xobjreal*alturareal), and finally, "xajustado" and "yajustado" are the x-axis and y-axis values of the point at the center of the display area within the Virtual image (initial values: equal to xobjreal and yobjreal, respectively).

The first image displayed will show all the content of the original digital picture, if the source images are proportional (and keep the same orientation) to the display area; or otherwise, it will show as much content of the source image as their proportions allow (i.e. if the display area is square while the source images are landscape). If it is not possible to display all the content, the method and/or system still allows the end user to visualize the missing content by using the pan navigation. The below steps are used by the initialization component to determine the dimensions of the Virtual image.

If recorte is greater than the height of the Cut-Region image: Step One.—Make real equal to recorte, and determine the height of the Virtual image, by dividing the height of the source image by the width of the source image times recorte. Step Two.—If the height of Virtual image is less than the height of the Cut-Region image, then recalculate real, by dividing recorte by the height of Virtual image times the height of the Cut-Region image, and make the height of Virtual image equal to the height of the Cut-Region image.

Or (exclusive), if recorte is less than or equal to the height of the Cut-Region image: Step One.—Make the height of Virtual image equal to the height of the Cut-Region image, and determine real, by dividing the width of the source image by the height of the source image times the height of the Cut-Region image. Step Two.—If real is less than recorte, then recalculates the height of Virtual image, by dividing the height of the Cut-Region image by real times recorte, and make real equal to recorte.

For example, if the smallest source image is 140×105, then 270 is greater than 265.5, and so the following calculations apply: Step One.—real=270. Height of Virtual image=105/140*270=202.5. Step Two.—Since 202.5 is less than 265.5, then: real=270/202.5*265.5=354, and the height of the Virtual image=265.5. In consequence, alturareal=265.5/354=0.75 (which corresponds to the same proportion of the source image=105/140).

The photographs of objects of interest (OI) with larger height than width must be taken with a landscape orientation if the specific embodiment needs to guarantee that the whole content of the OI is shown in the first image, since the method and/or system are not designed to determine how much of the image the OI covers. By the same token, portrait photographs must be taken if the OI has a larger width than height.

The dimensions of the Virtual image are used to maintain the display area and the Cut-Region image within the boundaries of the whole content of the source images, but such dimensions aren't necessarily equal to those of the real image (if it would exist), hereinafter called "Real image". This is evident by the fact that (if factorecorte is greater than 1) the first image displayed (the Real image) is smaller than the Virtual image. The following elements are used to determine the size of the Virtual image and the Real image:

"increments" is the width of the Virtual image for a specific Local image cycle (because the Local image is re-initialized for every cycle). Initial value: it is equal to real. The value for the next cycle (zoom-in)=previous incremento+(localincr*previous incremento/base)*mod.

"tamano" is the width of the Real image for a specific Local image cycle. It is used to determine the limit for the zoom-in magnification (before quality of the image is compromised). The value of tamano is calculated using the same formula for increments, and its initial value is: real/factorecorte.

"stepCount" represents the current position of the viewer from the magnification perspective, relative to the initial image. In other words, its value corresponds to the zoom level. Initial value: cero (representing the first image displayed by the method and/or system). Values: any integer value equal to or greater than cero.

For example, FIG. 10 shows the values of increments and tamano for 4 cycles of the Local image, for maxSize=640 (and using the values either provided or calculated from previous examples herein). The values of incremento and tamano do not change for values of StepCount within the same Local image cycle; for example, based on FIG. 10, incremento is equal to 531 for stepCount values from 10 to 19.

The width of the Virtual image at any given zoom level corresponds to the difference between the value of incremento for the next cycle and its current value (relative to the stepCount position), dividing the result by mod. Based on FIG. 10, and being stepCount equal to 12, the width of Virtual image=(796.5−531)/10=584.1. The same formula (using tamano instead) is used to determine the width of the Real image.

FIG. 11 shows the width values for the Virtual image and the Real image, corresponding to some exemplary stepCount values (again, using the values either provided or calculated from previous examples herein). The maximum zoom level allowed by the method and/or system would be stepCount=24, because beyond that point, the width of the Real image would be larger than the largest of the source images (of width 640). It can be noted as well, that valid boundaries (two-dimensional space of Virtual image) for the display area and the Cut-Region image are greater than maxSize for stepCount 23 and stepCount 24.

Navigation Component.—The embodiments can define the most convenient user interface for each specific situation, while the navigation component defines the required behavior in order to synchronize the images accordingly. This approach is in line with the generic design of the present invention. There is a wide range of hardware devices available to the end-user, and in many cases, different ways to implement the interface for the same device. For example, on a cellular phone, the navigation keys (known as soft-keys) and/or hard-keys (alphanumeric keys) can be used; or on a PC based implementation, the numerical path and/or the mouse can be used. The navigation component requires the user interface to provide unique values (as a result of the end user action: press a key, move a joystick, use the mouse, etc.) that can be identified as follows:

UP, DOWN, RIGHT, and LEFT navigation values.—. The four values are needed for pan and rotation. The zoom navigation requires only two values, which can correspond to any of these navigation values or they can correspond to different ones (IN and OUT, for example). It is possible as well to assign more than one value to the same motion (allowing the use of more than one key, for example). The programs in the annexed computer program listing appendix use the UP motion as the zoom-in, and DOWN for zoom-out, but they could have used at the same time (or instead) the RIGHT motion for zoom-in and LEFT for zoom-out, for example.

FIRE navigation value.—This value is used to navigate thru the three different states of the method and/or system: zoom, pan, and rotation. The transition between these states follows the same order at execution; once the last state is reached, the next transition is set to the first state. Or, as mentioned earlier, ZOOM, PAN, and ROTATE navigation values can be used instead (or in addition).

The rotation is achieved by changing the reference of the source image in turn, that is, changing the value of the row or column referred in the section "Production component" in this application. In order to reduce data transfer, the navigation component only retrieves the portion of the source images needed to cover the display area. Some of the attributes of rotation are: "dir" is the relative direction that results from a specific motion (its value is 1 for RIGHT, UP, or IN, and−1 for LEFT, DOWN, or OUT), "xcuadro" corresponds to the column value, and "ycuadro" corresponds to the row value. The below attributes are used by the three types of navigation (rotation, pan, and zoom).

"posicion" relates to the source images referred in the section "Transformation component" in this application. Its purpose is to ensure that the scaled image and/or original image (to be used for the retrieval of the content section at a given time) is large enough. Values: cero to n−1 (where 'n' is the number of scaled images).

"largo" and "altura" are the width and height of the section of the source image to retrieve. These values are calculated every time a new section is required. The value of altura can be obtained by multiplying largo times alturabase.

"x0" and "y0" are the x-axis and y-axis values of the point at the top left corner of the image section to retrieve, within the source image. The value of y0 follows the same formula to calculate x0 (provided later in this application), but using yobjreal and altura instead.

For xcuadro, the navigation component sets to cero the next value following hframes−1, so that there is an uninterrupted rotation of images on the horizontal axis. In the case of ycuadro, the navigation component ensures that its value is always between cero (image at the bottom) and vframes−1 (image at the top).

In the preferred embodiment, the navigation component uses a separate Thread to retrieve and/or request the images, so that it is responsive to the end user input. In order to take advantage of this Thread, the images are prefetched. For example, if the current motion is UP, the navigation component displays the image requested (which was previously prefetched), and immediately retrieves and/or requests the next image following the same UP direction.

The xcuadro and ycuadro values of a prefetched image are kept by the navigation component for comparison with those of the user's next input. If the values don't match, then: the previously prefetched image is discarded, the image corresponding to the current request is retrieved, and the next image following that one is prefetched.

For rotation, the value of largo=base*(recorte*img[posicion]/real)/local; where img[posicion]is the width of the smaller source image of width equal to or greater than real. And, x0=(xajustado*img[posicion]/real)−largo/2.

FIG. 12 shows the values of xcuadro, ycuadro, and the source image used for an exemplary navigation. In this example, the following values were used: hframes=10, and vframes=5. As it can be noted from FIG. 12, the last motion didn't change the value of xcuadro nor ycuadro because the top most source image is at row 4 (no image was retrieved by the method and/or system neither).

In the preferred embodiment, for zoom in/out a threading and prefetching approach similar to the one used for rotation is used. The navigation component uses stepCount to determine the current zoom level, and in order to verify if the previously prefetched image corresponds to the end user request in turn. The below are some attributes related to zoom.

"desplaza" is a convenience variable predetermined by the embodiment during execution of the initialization component. Values: positive integer number greater than cero.

"desp" relates to the pan movement, but it is described here because it is updated by zoom every time a new Cut-Region image is retrieved or requested. The value of desp represents the number of pixels the image will be moved for each pan motion. In the preferred embodiment, this value changes proportionally with each change on the size of the Virtual image, so that each pan movement covers the same relative distance of the whole content of the image, independently of the size of the Virtual image. Value: real/desplaza.

For every change of stepCount, the navigation component updates: local, xobj, yobj, xl, and yl. The new values of xobj and yobj are relative to the previous size of the Local image (i.e. xobj=local/previous local value*xobj); while xl and yl maintain their relative position (i.e. xl=base/2−xobj).

For a new Cut-region image, the navigation component updates: real, xajustado, xobjreal, yajustado, yobjreal, and desp. The new values of xajustado and yajustado are relative to the previous real value (i.e. xajustado=real/previous real value*xajustado). The values of xobjreal and yobjreal are made equal to xajustado and yajustado, due to the retrieval of a new section from the source images.

The zoom navigation sets largo=recorte*img[posicion]/incremento[stepCount/mod]; where incremento[stepCount/mod] is the width of the Virtual image for the current Local image cycle, and sets x0=(xobjreal *img[posicion]/incremento[stepCount/mod])−largo/2.

The pan navigation changes the current Local image by adding a new portion of the source image on the direction of the motion, and discarding an equal area from its opposite side, that is, pan retrieves only the section of the source image needed, in order to improve the performance. Given the small size of the images retrieved, the programs in the annexed computer program listing appendix do not implement threading neither prefetching. An embodiment requiring such functionality can use dir as the matching value.

Each pan motion updates the values of xobj, xl, and xajustado (for RIGHT or LEFT), or yobj, yl, and yajustado (for UP or DOWN). The value of desp is added to or subtracted from xobj, yobj, xl, and/or yl, depending on the navigation motion (i.e. RIGHT: xobj=xobj+desp, and xl=xl−desp). If desp is added to xobj or yobj, then desp is subtracted from xl or yl. Finally, xajustado or yajustado are updated using the relative value of desp with respect to recorte (i.e. RIGHT: xajustado=xajustado+desp*recorte/local).

After updating the above values, the pan navigation causes the navigation component to validate that the elements are within the boundaries allowed, and adjust their values if they don't (as it will be described shortly herein). Next, the current Local image is recomposed as described earlier. The value of largo is set to: recorte*img[posicion]/real, and x0=(xobjreal*img[posicion]/real)−largo/2.

For zoom and pan, the navigation component executes some validations to ensure that various elements are within the valid boundaries mentioned earlier in this application. Flags are used to determine if a boundary has been reached, so that the next navigation is ignored if it follows the same direction. Any value out of boundary is set within the minimum or maximum value allowed for that specific boundary (in that direction). The validation is done for each boundary: top, bottom, left, right, in, and out. The steps below describe the validation executed for the left boundary. The navigation component uses similar validation steps for the other boundaries.

Step One.—The validation proceeds with the next validation steps only if the display area is outside the left boundary of the Local image or if the Cut-Region image is outside the left boundary of the Virtual image.

Step Two.—If this is a zoom-out motion and the updated stepCount is in a different Local image cycle, then the navigation component executes this step without executing the rest of the validations. For this step, it updates xobjreal with its minimum value (xobjreal=recorte/2), if xajustado is outside the Cut-Region image then it is updated too (xajustado=base/2*recorte*local), and finally, it updates xobj and xl (xobj=xajustado*local/recorte, xl=base/2−xobj).

Step Three.—If this is a pan or zoom-out motion, then it updates xobjreal, taking into account that it might already have in the Cut-Region image a portion of the section of the source image needed: xobjreal=xobjreal−((base/2−xobj)*(recorte/local)).

Step Four.—If the value of xobjreal places the Cut-Region image outside the left boundary of the Virtual image, then xajustado=xajustado+(recorte/2−xobjreal), and xobjreal=recorte/2.

Step Five.—It updates xobj and xl (xobj=base/2, xl=0).

Retrieval Component.—In the preferred embodiment, the retrieval component uses the following values in order to retrieve the content required from the source images: archivo, x0, y0, largo, altura, "ancho", "alto", xcuadro, ycuadro, and posicion; where ancho and alto correspond to the dimensions of the reduced version of the image needed, calculated by the navigation component as: the Cut-Region image dimensions for magnification (zoom), the Local image dimensions for pan, and the display area dimensions for rotation. A specific embodiment may add other elements as required to achieve its specific requirements, such as: location of the image/file, image color resolution, image format, etc.

Display Component.—The final result is achieved by displaying the image in turn, following the end user desired navigation, simulating a 2D and/or 3D visual experience. The display component displays the updated content of Local image, using xl and yl to determine its relative position with regard to the display area, as previously mentioned herein. It is recommended to display an indicator (or short text) somewhere on the screen of the end user computing device, so that the end user knows the current state of the navigation (zoom, pan, or rotation) at all times.

The invention claimed is:

1. An image processing system comprising a plurality of image processing devices that facilitate navigating through content of images without fragmenting the content of the images into tiles or tile- sub components, and the system comprising:

an image processing device for displaying an image;
production and transformation components that transform an original source image into one or more successive smaller images without fragmenting their content, wherein the one or more successive smaller images are the replicas of the original source image, and the one or more successive smaller images correspond to one of the following: a) flat file representations containing the red, green and blue color gradients of each pixel b) digital images on standard formats like png, gif, tiff, c) jpeg baseline;
zoom in, zoom out, pan and/or rotation through the content of the images, independently of their dimensions relative to those on the display area of the end user image processing devices;
initialization component that sets up navigation parameters, wherein the navigation parameters include values that the system takes into account to determine the amount of magnification per step and how much content from the source image should be retrieved for each magnification;
a retrieval component that accesses sections of said transformed images or source images and regulates the dimensions of a Cut-Region Image in order to fit the dimensions of the display areas of the end-user image processing devices, wherein by making the Cut-Region image larger than the display area, computing devices with enough data processing speed can magnify the Cut-Region image and use the content limits to produce zoom and pan visual effects locally, without requiring new sections for each navigation step. Furthermore, the retrieval component also regulates the dimensions of a Virtual Image, proportional to the transformed images or source images and having at least one side equal to the corresponding side on the Cut-Region Image, in order to produce the zoom visual effect by synchronizing the magnifications of the Cut-Region Image with the Virtual Image, and producing the pan visual effect by using the dimensions of the Cut-Region Image to determine if a new section from the transformed images or source images is required;
a display component that displays the image sections as one complete image on the end user image processing devices.

2. The system of claim 1, wherein said source images comprise one or more images.

3. The system of claim 1, wherein said source images are digital images of a standard image format.

4. The system of claim 1, wherein said source images are further identified following a naming convention based on the number of images and their position relative to the subject.

5. The system of claim 1, wherein said source images comprise images of an object of interest taken from various angles.

6. The system of claim 1, wherein said source images comprise images of a panoramic scene taken from various angles.

7. The system of claim 1, wherein said source images comprise images from sections or views, compositing a mosaic like arrangement of the subject.

8. The system of claim 1, wherein said source images comprise digital images of computer generated content.

9. The system of claim 1, wherein said source images are not transformed by said transformation component.

10. The system of claim 1, wherein said transformed images are magnified images of said source images.

11. The system of claim 10, wherein said transformed images are digital images of a standard image format.

12. The system of claim 1, wherein said transformed images are data files containing the color values of the pixels from their respective said source images.

13. The system of claim 12, wherein said data files correspond to magnified images of said source images.

14. The system of claim 12, wherein said data files further comprise the value representing the width and/or height of the images they represent.

15. The system of claim 12, wherein said data files further comprise the alpha value of the pixels from their respective said source images.

16. The system of claim 1, wherein at least one of its components is executed at a computing device with limited to very limited storage capacity and/or CPU speed, such as cellular phones.

17. The system of claim 16, wherein at least some of the images are physically stored in an external storage medium accessible to said computing device.

18. The system of claim 16, wherein at least some of the images are physically stored in said computing device's built-in medium.

19. The system of claim 16, wherein at least some of the images are physically stored in a remote computing device, such as a remote server, accessible via a wide area network (WAN).

20. The system of claim 16, wherein at least some of the images are physically stored in another computing device, such as a server, accessible via a local area network (LAN).

21. The system of claim 1, wherein at least one of its components is executed at a computing device with enough CPU speed, such as some PDAs and portable gaming devices.

22. The system of claim 21, wherein at least some of the images are physically stored in an external storage medium accessible to said computing device.

23. The system of claim 21, wherein at least some of the images are physically stored in said computing device's built-in medium.

24. The system of claim 21, wherein at least some of the images are physically stored in a remote computing device, such as a remote server, accessible via a wide area network (WAN).

25. The system of claim 21, wherein at least some of the images are physically stored in another computing device, such as a server, accessible via a local area network (LAN).

26. The system of claim 1, wherein at least one of its components is executed at a computing device with high storage capacity and CPU speed, such as most PCs and laptop computers.

27. The system of claim 26, wherein at least some of the images are physically stored in an external storage medium accessible to said computing device.

28. The system of claim 26, wherein at least some of the images are physically stored in said computing device's built-in medium.

29. The system of claim 26, wherein at least some of the images are physically stored in a remote computing device, such as a remote server, accessible via a wide area network (WAN).

30. The system of claim 26, wherein at least some of the images are physically stored in another computing device, such as a server, accessible via a local area network (LAN).

31. The system of claim 26, wherein said computing device is a mainframe (a.k.a. host), which renders sections of the images to dumb (a.k.a. CRT) terminals.

32. The system of claim 1, wherein the source images are not created by said production component, but still made available to the other components of the system.

33. A computer-readable medium having stored thereon the components of claim 1.

34. The system of claim 1, wherein the initialization component correlates the dimensions of said source images or said transformed images with the dimensions of the display area, by creating at least the following:
   an intermediate image, equal to or larger than the display area, with dimensions proportional to the later;
   an intermediate image with dimensions proportional to those of said source images or said transformed images, and having at least one of its sides equal to the corresponding side of the intermediate image referred above.

35. The system of claim 34, wherein said intermediate images are virtual images, that is, only their dimension values are used by the system, not their content.

36. The system of claim 34, wherein said intermediate images are digital images.

37. The system of claim 34, wherein said intermediate images are data files with values representing digital images.

38. The system of claim 34, wherein said intermediate images are further magnified to simulate zoom into or zoom out navigation through the content.

39. The system of claim 1, wherein the navigation component facilitates the navigation through the content in part according to the input received from a user interface (UI).

40. The system of claim 1, wherein the navigation component facilitates the navigation through the content in part according to the input received from a device control, such as touch pads, joysticks, touch screens, cellular phone soft-keys, cellular phone hard-keys, and the like.

41. The system of claim 1, wherein the navigation component facilitates the navigation through the content in part according to the input received from an input component, such as software applications and browsers.

42. The system of claim 1, wherein the navigation component allows the end user to zoom in, zoom out, and/or pan through the content.

43. The system of claim 42, further comprising the simulation of content rotation by displaying images of the subject on a sequence that follows a circle like order/motion.

44. The system of claim 1, wherein the navigation component facilitates the navigation through the content in part according to the (x,y) position of the point at the center of the display area within the two-dimensional space of the content at a given magnification.

* * * * *